United States Patent [19]
Brown

[11] Patent Number: 5,412,308
[45] Date of Patent: May 2, 1995

[54] DUAL VOLTAGE POWER SUPPLY

[75] Inventor: Preston D. Brown, Eugene, Oreg.

[73] Assignee: Hewlett-Packard Corporation, Palo Alto, Calif.

[21] Appl. No.: 214,088

[22] Filed: Mar. 15, 1994

Related U.S. Application Data

[63] Continuation of Ser. No. 1,019, Jan. 6, 1994, abandoned.

[51] Int. Cl.[6] ............................................. G05F 1/577
[52] U.S. Cl. ..................................... 323/267; 323/222; 323/272; 307/75
[58] Field of Search ............... 323/265, 267, 268, 271, 323/282, 289, 222, 224, 266, 272; 363/71; 307/11, 18, 28, 43, 75

[56] References Cited

U.S. PATENT DOCUMENTS

| | | | |
|---|---|---|---|
| 3,740,569 | 6/1973 | Carcia | 307/11 |
| 4,034,232 | 7/1977 | La Venture | 307/32 |
| 4,320,447 | 3/1982 | Krauss | 363/63 |
| 4,636,709 | 1/1987 | Ohsawa | 323/267 |
| 4,849,868 | 7/1989 | Fisher | 363/21 |
| 5,066,901 | 11/1991 | Cheah et al. | 323/267 |

OTHER PUBLICATIONS

Huffman, "Switching Regulator Provides a Constant 5V Output from 3.5V to 40V Input Without the Use of a Transformer," Linear Technology Corporation, Jul. 30, 1992, 6 pages.

Nelson, "LT1070 Design Manual," Linear Technology Corporation Linear Applications Handbook, A Guide to Linear Circuit Design, 1990, Application Note 19, Jun., 1986, pp. AN19-1-AN19-76.

Williams, "Switching Regulators for Poets," Linear Technology Corporation Linear Applications Handbook, A Guide to Linear Circuit Design, 1990, Application Note 25, Sep., 1987, pp. AN25-1-AN25-24.

Huffman, "Switching Regulator Circuit Collection," Linear Technology Corporation Linear Applications Handbook, A Guide to Linear Circuit Design, 1990, Application Note 30, Feb., 1989, pp. AN30-1-AN30-44.

Williams, "Step Down Switching Regulators," Linear Technology Corporation Linear Applications Handbook, A Guide to Linear Circuit Design, 1990, Application Note 35, Aug., 1989, pp. AN35-1-AN35-32.

Huffman, "A Battery Powered Lap Top Computer Power Supply," Linear Technology Corporation Linear Applications Handbook, A Guide to Linear Circuit Design, 1990, Design Notes, DN18-1-DN18-2.

Primary Examiner—Steven L. Stephan
Assistant Examiner—Adolf Berhane

[57] ABSTRACT

A high efficiency power supply for producing two regulated output voltages (i.e. 3.3 and 5 volts) from an unregulated input voltage. The supply includes a 4–15 volt battery pack, a first (5.0 volt) output, a second (3.3 volt) output, and a ground. The positive terminal of the battery is connected directly to the second output. The 3.3 volt differential with ground is maintained by a voltage regulator that couples the negative terminal of the battery pack to ground (i.e. ground floats relative to the battery). A second voltage regulator couples the positive terminal of the battery pack to the first output, and maintains this first output at 5.0 volts relative to ground. This latter regulator is capable of boost operation, permitting a 5.0 volt output to be maintained even if the battery pack voltage is less than this value. Neither regulator includes a transformer, making the supply particularly well suited for use in miniaturized equipment, such as palmtop computers.

13 Claims, 2 Drawing Sheets

DUAL VOLTAGE POWER SUPPLY

This is a continuation application Ser. No. 08/001,019 filed on Jan. 06, 1994, now abandoned

FIELD OF THE INVENTION

The invention relates to an apparatus and method for providing two regulated output voltages from a single input voltage source. More particularly, the invention relates to a highly efficient power supply that produces two regulated outputs from an input source that may vary over a wide range of voltages.

BACKGROUND AND SUMMARY OF THE INVENTION

A primary objective of microelectronic circuit design is to develop compact components that consume minimal power. As integrated circuit chips shrink in size, it is imperative that the power supplies that provide power for these chips also become compact, yet achieve high efficiencies. With the advent of hand held computers, the need for compact and efficient power supply topologies is acute because these computers are very compact and run on batteries whose useful lifetimes are relatively short.

To reduce power consumption, integrated circuit manufacturers have developed components that require 3.3 volts rather than the typical 5 volt input supply voltage. However, because not all components are available with 3.3 volt operation, some systems require both a 3.3 and 5 volt power supply. The power supply must, therefore, provide two regulated outputs.

Certain applications, such as portable computer systems, require a power supply that can provide two regulated output voltages from an input voltage source that varies from voltages above the higher regulated output to voltages between the regulated outputs. Typically, portable computer systems have battery packs that provide D.C. voltages ranging from 4 to 15 volts. To provide a 3.3 and 5 volt regulated output, the power supply must be capable of converting the input voltage to both a higher and a lower voltage.

Existing power supplies that meet the desired performance characteristics typically use transformers to provide regulated outputs. Such power supplies, however, suffer from several drawbacks. For example, in power supplies that use transformers, it is very difficult to turn off one of the regulated outputs to save power consumption (as is sometimes desired in 3.3/5 volt systems). Further, transformers impair efficiency because energy is lost in the transfer of energy between the primary and secondary windings. Finally, transformers require more space and therefore are less desirable in compact circuit layouts.

Power supplies without transformers do exist, yet these power supplies are relatively inefficient and generally do not provide two regulated outputs. For example Linear Technology Corporation has published an application note regarding a switching regulator that provides a constant 5 volt output from a 3.5 to 40 volt input without using transformers. This particular regulator requires two inductors and employs capacitive coupling to produce a single 5 volt output. Because of the losses in the circuit elements and the use of capacitive coupling, the efficiency of this regulator is below 80%. Producing only one regulated output, this regulator is unsuitable for applications requiring two regulated outputs.

It is desirable, therefore, to have a power supply without transformers that is capable of efficiently providing two regulating outputs from a varying input voltage.

In accordance with the present invention, a high efficiency power supply produces two regulated voltage outputs (such as 3.3 and 5.0 volts) from an unregulated input voltage. The preferred circuit features an efficiency greater than 80% and is well adapted for miniaturized implementation.

In greater detail, the preferred embodiment includes a 4-15 volt battery pack, a first (5.0 volt) output, a second (3.3 volt) output, and a ground. The positive terminal of the battery is connected directly to the second output. The 3.3 volt differential with ground is maintained by a voltage regulator that couples the negative terminal of the battery pack to ground (i.e. ground floats relative to the battery). Another voltage regulator couples the positive terminal of the battery pack to the first output, and maintains this first output at 5.0 volts relative to ground. This latter regulator is capable of boost operation, permitting a 5.0 volt output to be maintained even if the battery pack voltage is less than this value.

The foregoing and other advantages and features will be more readily apparent from the following detailed description, which proceeds with reference to the accompanying drawings.

BRIEF DESCRIPTIONS OF THE DRAWINGS

DETAILED DESCRIPTION

Figure 1:
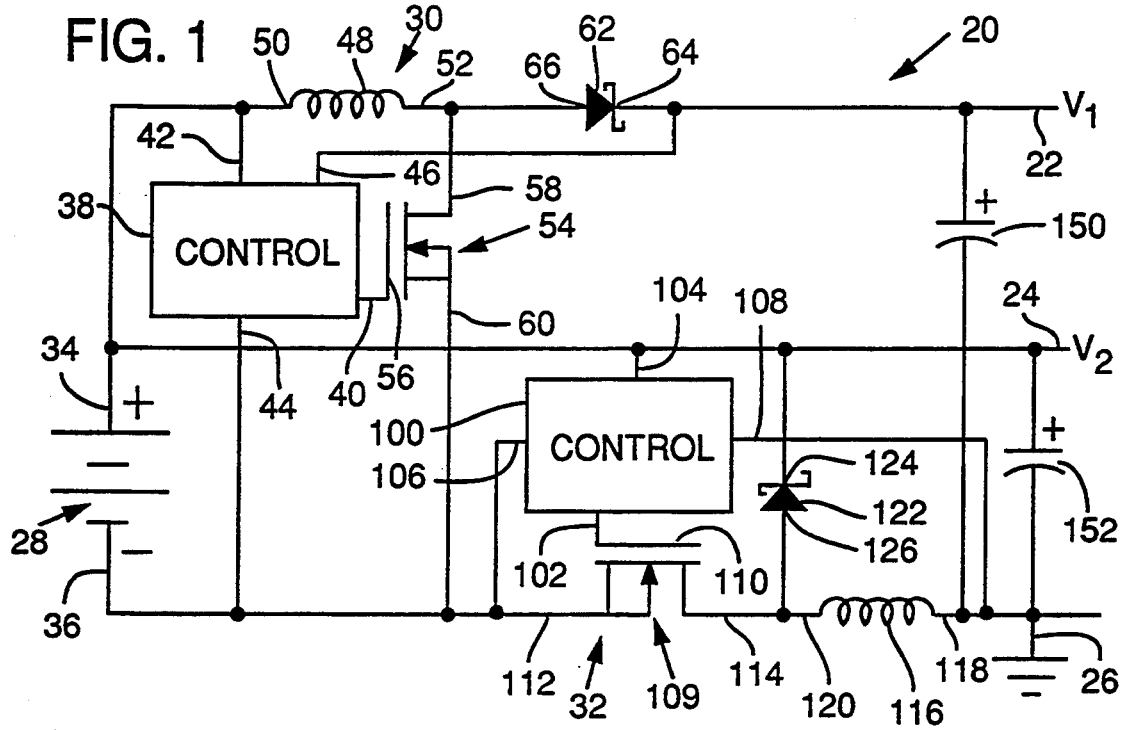
FIG. 1 is a circuit diagram of a power supply according to the invention.

FIG. 1 is a circuit diagram of a power supply 20 according to one embodiment of the invention. The power supply 20 comprises first and second output terminals 22, 24 a ground terminal 26, an input voltage source 28, and first and second voltage regulators 30, 32.

The power supply 20 includes an input voltage source 28 for supplying voltage to the first and second voltage regulators. Varying over a range of D.C. voltages, the input voltage source 28 may include nickel cadmium, nickel hydride, or lithium ion rechargeable batteries. Alternatively the input voltage source 28 may include alkaline batteries. While virtually any D.C. voltage source within the allowable range of the power supply 20 may be substituted for these batteries, these batteries are the preferred voltage source because of their portability and compact size. The input voltage source typically comprises a battery pack including a battery and related circuitry coupled to positive and negative terminals. The input voltage source may also be an A.C. adapter to convert A.C. voltage to a D.C. supply voltage. The input voltage source produces a voltage across positive 34 and negative 36 terminals to supply voltage to the voltage regulators.

The first voltage regulator 30 is coupled between the input voltage source 28 and the first output terminal 22 and converts the input voltage to an output voltage V₁ at the first output terminal 22. The first voltage regulator comprises a first control device 38 having first 40, second 42, third 44, and fourth terminals 46, a first inductive element 48 having an input 50 and an output 52, a first switch 54 having a control 56 and first 58 and second 60 terminals, and a first diode 62 having a cathode 64 and an anode 66.

In the first voltage regulator 30, the positive terminal 34 of the input voltage source 28 supplies a voltage to the second terminal 42 of the control device 38 and to the input 50 of the first inductive element 48. The output 52 of the first inductive element 48 is coupled to the first terminal 58 of the first switch 54 and the anode 66 of the first diode 62. The cathode 64 of the first diode 62 is coupled to the first output terminal 22. The first terminal 40 of the control device 38 actuates the control terminal 56 of the first switch to enable current to flow from the first inductive element 48, though the first switch 54, and to the negative terminal of the input voltage source 36. When the first switch 54 is turned off, the first diode 62 is forward biased and current flows from the first inductive element 48 to the first output terminal 22. The third terminal 44 of the control device 38 is coupled to the negative terminal 36 of the input voltage source 28, and the fourth terminal 46 is coupled to the first output terminal 22. The third 44 and fourth terminals 46 of the first control device 38 are part of a level adjustor, discussed below, that provides feedback for the first control device.

Figure 2:
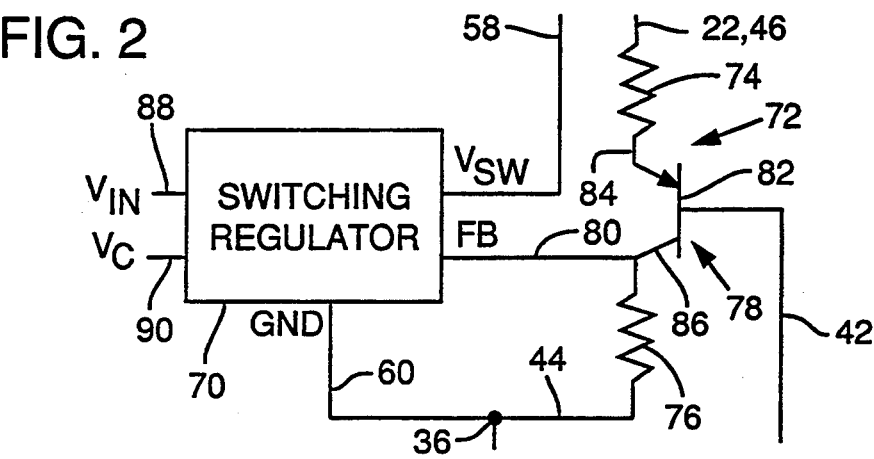
FIG. 2 is a diagram of the first control device of the power supply.

FIG. 2 is a diagram of the first control device of the power supply. In a preferred embodiment of the invention, the first control device 38 and the first switch 54 are components of an integrated circuit switching regulator 70. The switching regulator 70 may be a LT1170 available from Linear Technology or any equivalent hardware configured to perform voltage switching control in response to predetermined voltage levels.

Referring now to FIGS. 1 and 2, the first terminal 40 of the first control device 38 and the first switch 54 in FIG. 1 correspond to internal circuitry of the switching regulator 70 shown in FIG. 2. The first terminal 58 of the first switch corresponds to the Vsw pin 58, and the second terminal 60 of the first switch 54 corresponds to the GND pin 60 of the switching regulator. When the voltage at the first output terminal 22 drops below five volts, the switching regulator 70 allows current to flow from the Vsw pin 58 to the GND pin 60. The switching regulator 70 allows this current to flow in pulses until the desired voltage of 5 volts is restored at the first output 22.

The second 42, third 44, and fourth 46 terminals of the first control device 38 correspond in part to a level adjustor circuit 72 providing feedback to the switching regulator of FIG. 2. A first 74 and second 76 resistor and a PNP transistor 78 combine to form a level adjustor to maintain a voltage of approximately 1.2 volts between the FB ("feedback") terminal 80 and GND ("ground") 60 terminal of the LT1170 switching regulator 70. The base 82 of the transistor 78 is coupled to the positive terminal of the input voltage source 34, which is also the second regulated output 24. The first resistor 74 is coupled between the first output terminal 22 and the emitter 84 of the transistor 78. Finally, the second resistor 76 is coupled between the collector 86 of the transistor 78 and the negative terminal 36 of the input voltage source 28.

FIG. 2 shows additional connections to the switching regulator 70. The Vin pin 88 is the input supply voltage of the switching regulator 70. The Vc pin 90 is a compensation pin which is used for frequency compensation and for shutdown of the switching regulator 70.

To summarize the relevant connections to the first control device 38, the second terminal 42 of the first control device corresponds to the base connection 82 of the transistor; the third terminal 44 corresponds to the connection of the second resistor 76 to the negative terminal of the input voltage source 36; and the fourth terminal 46 corresponds to the connection of the first resistor 74 to the first output terminal 22. The diagram of FIG. 2 thus includes the first control device 38 and the first switch 54 of the power supply shown in FIG. 1.

Referring generally now to FIG. 1, the second voltage regulator 32 is coupled between the input voltage source 28 and the second output 24 and ground 26 terminals and converts the input voltage to the second output voltage V₂. The second regulator circuit 32 comprises a second control device 100 having first 102, second 104, third 106, and fourth 108 terminals, a second switch 109 having control 110 and first and second terminals 112, 114, a second inductive element 116 having an input 118 and an output 120, and a second diode 122 having a cathode 124 and an anode 126.

In the second voltage regulator 32, the positive terminal 34 of the input voltage source 28 supplies a voltage to the second output terminal 24. The negative terminal 36 is coupled to a first terminal 112 of the second switch 109 and to the third terminal 106 of the second control device 100. The input 118 of the second inductive element 116 is coupled to ground 26, and the output 120 is coupled to the anode 126 of the first diode 122, and a second terminal 114 of the second switch 109. The first terminal 102 of the second control device 100 actuates the control terminal 110 of the second switch 109 to allow current to flow from the second inductive element 116, through the second switch 109, and to the negative terminal 36 of the input voltage source 28. The second terminal 104 of the control device 100 is coupled to the second output voltage 24 to sense the voltage at the second output so that the second control device 100 actuates the second switch 109 when the second output voltage drops below a predetermined level.

Figure 3:
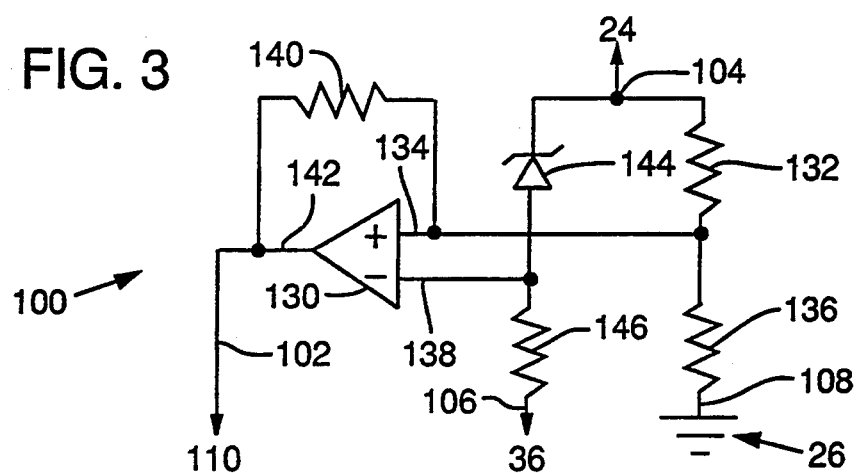
FIG. 3 is a diagram of the second control device of the power supply.

Referring now to FIG. 3, the second control device 100 includes an operational amplifier 130 ("op amp") configured with positive feedback such that it produces discrete high and low voltage outputs at the control terminal 110 of the second switch 109. The second control device thus operates as a comparator with hysteresis that senses the voltage at the second output terminal 24, and produces a "high" voltage at the gate 110 of the second switch 109, when the second output voltage falls below a predetermined level.

The second control device 100 includes a first resistor 132 coupled between the second output terminal 24 and the non-inverting input 134 of the op amp 130, and a second resistor 136 coupled between the non-inverting input 138 and ground 26. The first and second resistors divide the second output voltage to produce a voltage at the non-inverting input of the op amp that is directly related to the second output voltage.

A feedback resistor 140 is connected in a positive feedback loop between the non-inverting input 134 and the output 142 of the op amp 130. Producing hysteresis, the positive feedback causes the output of the op amp to stay in the "high" state until the second output voltage has reached a desired level. Connected at the inverting input 138 of the op amp 130, a reference diode 144 is coupled to the second output terminal 24, and a third resistor 146 is coupled to the negative terminal 36 of the input voltage source 28. The reference diode may be a zener diode that locks the voltage at the inverting input of the op amp to 2.5 volts below the second output voltage when reverse biased.

The switching function performed by circuit 100 can be implemented by several alternative means. For example, a integrated circuit switching regulator could be used as well as discrete circuit components configured to switch at a predetermined voltage level.

To summarize the connections of the second control device 100, the first terminal 102 corresponds to the output of the operational amplifier 142; the second terminal 104 corresponds to the connection of the reference diode 144 and the resistor 132 to the second output terminal 24; the third terminal 106 corresponds to the connection of the resistor 146 to the negative terminal 36 of the input voltage source 28, and the fourth terminal 108 corresponds to the connection of the resistor 136 to the ground terminal 26. FIG. 3 thus shows the circuitry and connections of the second control device.

The second control device 100 controls the switching of the second switch 109, which for the sake of explanation may be termed a ground switch. This name is used because the negative terminal 36 of the input voltage source 28 is not coupled to ground but to this ground switch. As a result, the voltage at the negative terminal 36 of the input voltage source 28 floats. When the ground switch is on, the voltage at the positive terminal 34 relative to ground 26 is the sum of the input voltage source 28 and the voltage across the second inductive element 116.

The first and second inductive elements 48, 116 and the first and second diodes 62, 124 of the power supply described above are well known and readily available. In the preferred embodiment, the inductive elements have values of 10 microhenries. The first and second diodes are MBRD630CT Schottky diodes from Motorola. Those skilled in the art may substitute any equivalent circuit or component to perform the same function as these elements.

Referring again to FIG. 1, first and second filtering capacitors 150, 152 are coupled from the first and second output terminals 22, 24, respectively, to the ground terminal 26. These filtering capacitors 150, 152 ensure that the power supply 10 provides a D.C. current to a load coupled across the output terminals 22, 24. Use of such filtering capacitors is well known to those in the art; thus, it is not necessary to describe the design considerations of these capacitors in further detail.

While this description describes the first and second voltage regulator circuits in detail above, it should be understood that one skilled in the art could change the above components and still perform the same function with equivalent circuitry. It is the intention of this description, therefore, to merely describe a particular embodiment of the invention without limiting the claimed invention to the specific structure described above.

Figure 4:
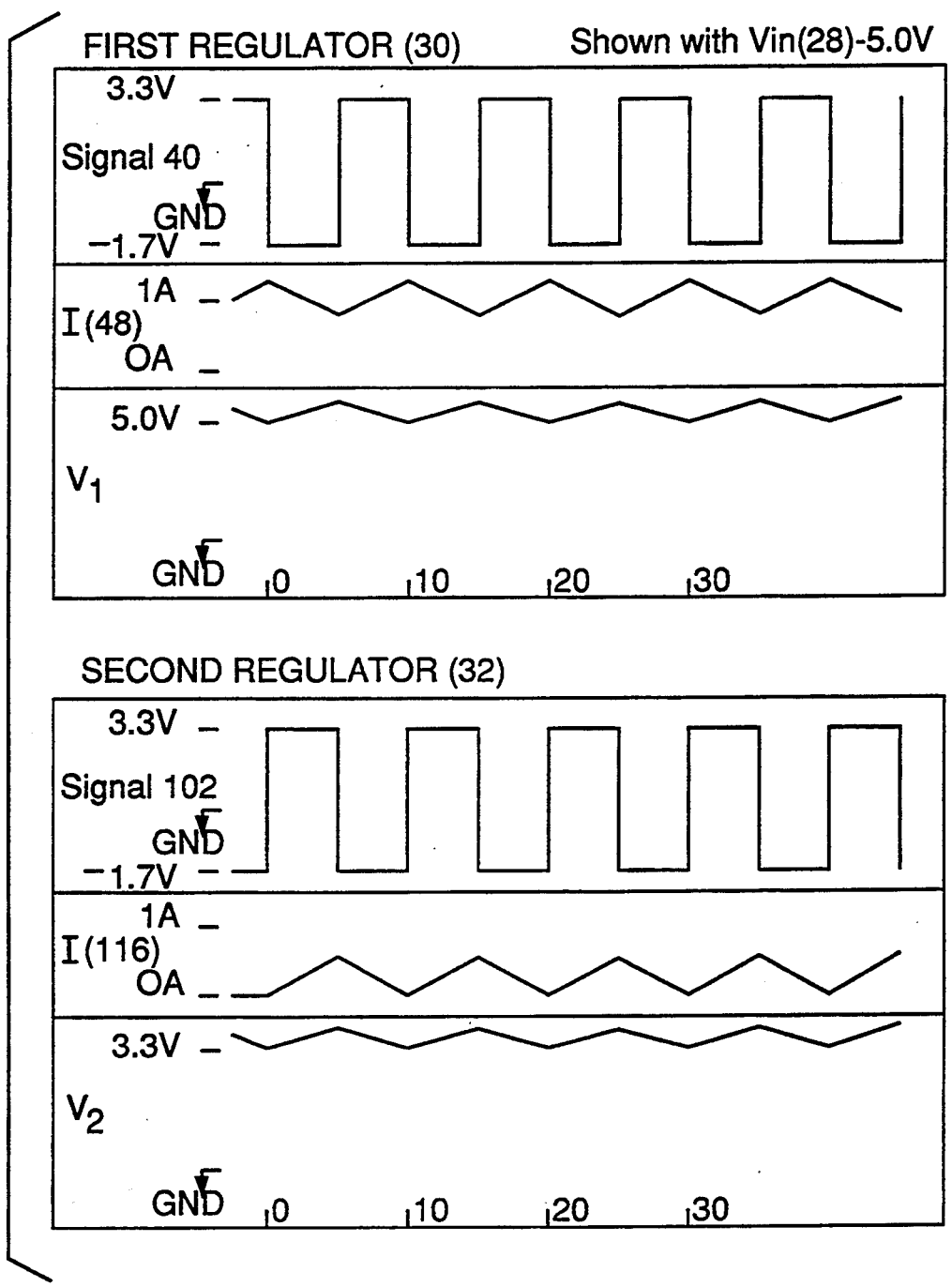
FIG. 4 is a set of waveforms illustrating the operation of the power supply.

In operation, the illustrated power supply 20 provides regulated output voltages of 3.3 and 5.0 volts from a source 28 that can range from 4 to 15 volts. FIG. 4 is a set of waveforms illustrating the operation of the power supply with the input voltage source 28 at 5 volts.

The first voltage regulator 30 provides a first output voltage $V_1$ on line 22 that may be higher or lower than the input voltage source 28. In FIG. 4, the first three waveforms illustrate the operation of the first regulator 30. The first voltage regulator senses the first output voltage, $V_1$, shown as a triangle wave oscillating about 5 volts. When the voltage at the first output terminal 22 drops below a predetermined level (5 volts for example), the first control device 38 pulses the control terminal 56 of the first switch. The output of the first control device at the first terminal 40 is the square wave labeled Signal 40 in FIG. 4. When Signal 40 is high, the first switch 54 is on, and current flows through the first inductor 48 and the first switch 54 to store energy in the first inductor. When the first switch 54 is on, current in the first inductor 48 increases as shown by the triangle wave I(48) of FIG. 4. When Signal 40 is low, the first switch 54 is off, and current flows from the first inductor 48 and through the first diode 62 to boost the output voltage, $V_1$. When the first switch is off, current in the first inductor decreases and the first output voltage increases. In this manner, the first voltage regulator converts the input voltage to the first output voltage and maintains a regulated output.

The second voltage regulator provides a second regulated output voltage $V_2$ at terminal 24. In FIG. 4, the last three waveforms illustrate the operation of the second regulator 32. The second output voltage, $V_2$, is a triangle wave oscillating about 3.3 volts as shown in FIG. 4. When the voltage at the second output terminal 24 drops below a predetermined level, the second control device 100 actuates the ground switch 109. The output of the second control device 100 at the first terminal 102 is the square wave labeled Signal 102 in FIG. 4. When Signal 102 is high, the ground switch is on, and the second inductive element stores energy. When the ground switch 109 is on, current in the second inductive element 116 increases. The voltage at the second output 24 increases until it reaches a predetermined level, at which time the second control device turns the ground switch 109 off. When the ground switch 109 is off, the energy stored in the inductor 116 is dumped through the second diode 122, allowing current to flow through the diode 122 to the second output. In this manner, the second regulator provides a regulated output voltage that may be lower than the input voltage source.

Having illustrated and described the principles of the invention in a preferred embodiment, it should be apparent to those skilled in the art that the invention can be modified in arrangement and detail without departing from such principles. For example, while the first control device has been described as a switching regulator, in other embodiments, other regulators can advantageously be used. In place of the second control device, an IC switching regulator, for example, can readily be substituted for the comparator with hysteresis.

In view of the many possible embodiments to which the principles of my invention may be put, it should be recognized that the detailed embodiment is illustrative only and should not be taken as limiting the scope of my invention. Rather, I claim as my invention all such modifications as may come within the scope and spirit of the following claims and equivalents thereto.

I claim:

1. A power supply comprising:

first and second output terminals and a ground terminal, the first and second output terminals and a ground terminal, the first and second output terminals providing output voltages of $V_1$ and $V_2$, respectively;

an input voltage source providing an input voltage of $V_{in}$;

first regulator means coupled between the input voltage source and the first output terminal for converting $V_{in}$ to $V_1$, the first regulator means capable of providing an output voltage higher than Vin, and capable of providing an output voltage lower than Vin;

second regulator means coupled between the input voltage source, the second output terminal, and the ground terminal for converting $V_{in}$ to $V_2$;

wherein neither the first nor second regulator means includes a transformer.

2. The power supply of claim 1 in which the first regulator means comprises a switching regulator.

3. The power supply of claim 2 which further includes an inductor and a diode serially interposed between the input voltage source and the first output terminal.

4. The power supply of claim 1 wherein the second regulator means includes a ground switch.

5. The power supply of claim 1 wherein neither the first nor second regulator means includes capacitive elements for transferring energy from the input voltage source to the first or second outputs.

6. The power supply of claim 1 having an efficiency greater than 80%.

7. The power supply of claim 1 wherein the second regulator means can produce an output voltage less than the input voltage provided by the input voltage source.

8. The power supply of claim 1 wherein the first and second regulator means include only one inductor each.

9. A power supply comprising:

first and second outputs providing output voltages of $V_1$ and $V_2$, respectively;

a input voltage source having a positive and negative terminal and providing an input voltage, Vin;

first and second voltage regulators, the second voltage regulator having first, second, and third terminals;

a ground terminal;

and a ground switch having first and second terminals, the first terminal being coupled to the negative terminal of the input voltage source;

the first voltage regulator being coupled to the positive and negative terminals of the input voltage source and the first output, the first voltage regulator capable of providing an output voltage higher than Vin, and capable of providing an output voltage lower than Vin;

the first terminal of the second voltage regulator being coupled to the positive terminal of the input voltage source and the second output;

the second terminal of the second voltage regulator being coupled to the second terminal of the ground switch;

and the third terminal of the second voltage regulator being coupled to the ground terminal;

wherein neither the first nor the second voltage regulator includes a transformer.

10. A method for providing two regulated outputs comprising:

providing an input voltage source with positive and negative terminals, first and second output terminals providing first and second output voltages, first and second voltage regulators without transformers, a ground, and a ground switch;

sensing the first output voltage from the first voltage regulator;

storing energy in the first voltage regulator;

maintaining the first output voltage at a first predetermined level that is higher than an input voltage provided by the input voltage source when the input voltage is less than the first predetermined level;

maintaining the first output voltage at the first predetermined level that is lower than an input voltage provided by the input voltage source when the input voltage is greater than the first predetermined level;

increasing the first output voltage by releasing the energy stored in the first voltage regulator if the first output voltage has dropped below the first predetermined level;

sensing the voltage at the second output terminal from the second voltage regulator;

storing energy in the second voltage regulator if the second output voltage has dropped below a second predetermined level by switching the ground switch and thereby coupling the negative terminal of the input voltage source to ground through the second voltage regulator; and regulating the second output voltage by selectively storing and releasing energy in the second voltage regulator.

11. A power supply comprising:

first and second output terminals and a ground terminal, the first and second output terminals providing output voltages of $V_1$ and $V_2$, respectively;

an input voltage source providing an input voltage of $V_{in}$;

first regulator means coupled between the input voltage source and the first output terminal for converting $V_{in}$ to $V_1$, the first regulator means capable of providing an output voltage higher than Vin, and capable of providing an output voltage lower than Vin;

second regulator means coupled between the input voltage source, the second output terminal, and the ground terminal for converting $V_{in}$ to $V_2$, the second regulator means coupled between the input voltage source and the ground terminal such that the input voltage source floats relative to the ground terminal;

wherein neither the first nor second regulator means includes a transformer.

12. The power supply of claim 11 wherein the input voltage source has a positive and negative terminal, the second regulator means coupled between the negative terminal and the ground terminal such that the voltage at the negative terminal of the input voltage source floats relative to the ground terminal.

13. The power supply of claim 12 wherein the second regulator means includes a ground switch, the ground switch coupled to the negative terminal.

* * * * *